United States Patent Office 3,636,128
Patented Jan. 18, 1972

3,636,128
OLEFIN OLIGOMERIZATION WITH A NICKEL-CONTAINING CATALYST SYSTEM
Howard E. Dunn, Bartlesville, Okla., assignor to
Phillips Petroleum Company
No Drawing. Filed Apr. 24, 1969, Ser. No. 819,105
Int. Cl. C07c 3/10
U.S. Cl. 260—683.15 D                    5 Claims

ABSTRACT OF THE DISCLOSURE

Olefins such as propylene are oligomerized to products such as dimers with a catalyst system comprising an organoaluminum compound such as ethylaluminum dichloride and a nickel complex such as [1,2-bis(diphenylphosphino)ethylene]dichloronickel, wherein the nickel component can be recovered and recycled to the oligomerization zone.

---

This invention relates to a process for the production of olefin oligomers such as olefin dimers, trimers, tetramers, and the like.

Various homogeneous catalyst systems, including a number of nickel-containing catalyst systems, are known to the art which are quite active with respect to the oligomerization of olefins, particularly to dimers.

It has now been found that olefins can be effectively oligomerized by contact with a catalyst system which is formed from an organoaluminum compound and a nickel complex which nickel complex is easily recoverable from the reaction mixture and which is reuseable in the oligomerization process. This nickel complex is a nickel complex such as [1,2 - bis(diphenylphosphino)ethylene]dichloronickel.

Accordingly, it is an object of this invention to provide a process for the production of olefin oligomers.

Another object of this invention is to provide an olefin dimerization catalyst system containing a nickel complex which is easily recoverable and reuseable.

Other aspects, objects, and advantages of this invention will be apparent to one skilled in the art from the disclosure and claims.

Cyclic and acyclic monoolefins having from 2 to 12 carbon atoms per molecule can be oligomerized according to the process of this invention. These olefins can be branched or unbranched, but the branching is preferably at least one carbon removed from the double bond. Specific examples are ethylene, propylene, butene-1, butene-2, pentene-1, pentene-2, cyclopentene, cyclohexene, 3-methylbutene-1, cycloheptene, hexene-2, heptene-1, cyclooctene, 4,4-dimethylheptene-2, decene-1, dodecene-1, and the like, and mixtures thereof.

The catalyst employed according to the process of this invention is formed from two components.

The first component of the catalyst system is represented by the formula $[(R_2'P-CR''=CR''-PR_2')Ni]_mY_n$ wherein each R' is a hydrocarbyl radical having from 1 to 20 carbon atoms; each R'' is hydrogen, an alkyl radical having from 1 to 5 carbon atoms, or a phenyl radical; each Y is an organic or inorganic anion; $m$ is an integer from 1 to 3; and $n$ is an integer from 1 to 2 depending on the valence of Y. Preferably, R' is an alkyl, cycloalkyl, or aryl radical, or a combination thereof and Y is a halogen, a pseudo halogen, or a carboxylate radical. Still more preferably R'' is hydrogen, Y is a halogen, $m$ is the integer 1 and $n$ is the integer 2.

Specific examples of R' groups are methyl, ethyl, 2-ethylhexyl, phenyl, allyl, propargyl, benzyl, cyclohexyl, dodecyl, eicosyl, and the like. Specific examples of R'' groups are hydrogen, methyl, n-propyl, 3-methylbutyl, phenyl, and the like. Specific examples of anions are chloride, bromide, iodide, fluoride, cyanide, cyanate, thiocyanate, acetate, benzoate, sulfate, and the like.

These nickel complexes can be prepared in any conventional method known to the art. For example, the nickel complex of the 1,2-bis(diphenylphosphino)ethylene can be prepared as described in Inorg. Chim. Acta 1(1), 141–4 (1967) (Eng.).

Other specific examples of these nickel complexes are:

[1,2-bis(dimethylphosphino)ethylene]dibromonickel;
[1,2-bis(dibenzylphosphino)ethylene]diiodonickel;
[1,2-bis(dicyclohexylphosphine)ethylene]difluoronickel;
[1,2-bis(di-o-tolylphosphino)ethylene]dicyanatonickel;
[1,2-diphenyl-1,2-bis(dieicosylphosphino)ethyene] dibenzoatonickel;
[1-methyl-1,2-bis(di-t-butylphosphino)ethylene] dicyanonickel;
[1,2-dipentyl-1,2-bis(dioctylphosphino)ethylene] dichloronickel;
[1,2-bis(diallylphosphino)ethylene]dibromonickel;
[1,2-bis(dipropargylphosphino)ethylene]diacetatonickel:
(1-diphenylphosphino-2-diethylphosphinoethylene)dibromonickel;
[1,2-bis(dihexylphosphino)ethylene]dichloronickel; and the like, and mixtures thereof.

A second component of the catalyst system is an organoaluminum compound represented by the formula $R_xAlX_y$ wherein R is a hydrocarbon radical having up to 20 carbon atoms, X is a halogen, $x$ is an integer from 1 to 3, and $y$ is 0 or an integer from 1 to 2 and $x$ plus $y$ equals 3. These compounds are well known in the art and can be prepared by conventional methods. Specific examples are methylaluminum dichloride, dimethylaluminum chloride, diethylaluminum bromide, ethylaluminum dibromide, triethylaluminum, vinyl aluminum diiodide, tributylaluminum, dibutylaluminum chloride, phenylaluminum dibromide, dibenzylaluminum chloride, 4-tolylaluminum dichloride, dodecylaluminum dibromide, eicosylaluminum difluoride, and the like, and mixtures thereof. Preferred compounds are the organoaluminum halides in which the R groups are the lower alkyl radicals.

Generally, the mole ratio of organoaluminum compound to nickel complex ranges from 0.5:1 to 20:1 and the mole ratio of nickel complex to olefin ranges from 0.00001:1 to 0.1:1. A larger amount of aluminum component is frequently desirable to scavenge catalyst poisons which may be in the system.

The catalyst is prepared by simply combining the first and second catalyst components under conditions of time and temperature which permit the catalytically active reaction product to be formed. This combination occurs very readily and, in general, the components can be mixed at any convenient temperature within the range of —80 to about 100° C. for a few seconds or for a period of time up to several hours generally in the presence of a diluent, if desired, in which both the components are at least partially soluble. Any convenient inert diluent, such as benzene, heptane, cyclohexane, chlorobenzene, methylene chloride, ethylene chloride, and the like can be used for this purpose. Halogenated diluents are generally preferred. The mixing of the two catalyst components is generally carried out in an inert atmosphere in the substantial absence of air or moisture. After the catalyst is formed, it need not be isolated but can be added directly to the olefin dimerization zone as a solution in its preparation solvent. If desired, catalyst components can be separately added, in any order, to the reaction zone, either in the presence or absence of the feed olefin.

The oligomerization of the olefin or mixture of olefins can take place at any convenient temperature within the range of —80 to 200° C., preferably —10 to 50° C. The reaction can be carried out at any convenient pressure which is sufficient to keep at least some olefin feed dissolved in the reaction medium. Thus, the reaction is carried out in the liquid phase with pressures ranging from about 0 to 2000 p.s.i.g. The reaction can be carried out either in the presence or absence of a diluent, preferably in the presence of a diluent such as those described for the catalyst preparation. The time of contacting generally ranges from 0.1 minute to 20 hours, preferably 5 to 120 minutes.

Any contacting technique can be utilized for the olefin conversion, such as batchwise or continuous operation. After the reaction period the products can be separated or isolated by conventional means such as fractionation, crystallization, adsorption, and the like. If desired, the catalyst can be destroyed by treatment with water prior to the separation of the products. In addition to dimers, varying amounts of other oligomers such as trimers, tetramers, and the like can also be formed in the reaction.

A feature of this invention is the fact that the nickel complex can be separated from the reaction mixture and reused in the catalytic olefin oligomerization zone. This complex is recovered by treating the reaction mixture with water or an aqueous acid solution such as aqueous hydrochloric acid. This treatment immediately kills the catalyst activity by destroying the aluminum component. Simultaneously, there is a precipitation of the nickel complex. The amount of water or acid which is used as this point is not critical but should be at least an effective amount sufficient to destroy the aluminum component, preferably a substantial excess of water or acid is used.

The nickel complex is recovered by simple filtration of the treated reaction mixture. The solid complex is then dried. It can then be recycled to the catalytic zone to be admixed with additional aluminum component for use in the oligomerization reaction.

The advantages of this invention are further illustrated by the following examples. The reactants and proportions and other specific conditions are presented as being typical and should not be construed to limit the invention unduly.

EXAMPLE I

To a dry reactor were added 0.0922 gram of [1,2-bis-diphenylphosphino)-ethylene]dichloronickel and 20 ml. of chlorobenzene. To this solution was added 1.5 ml. of ethylaluminum chloride and chlorobenzene. The reactor was then maintained at a temperature 16–20° C., and propylene was pressured into the vessel at 30 p.s.i.g. and maintained at that pressure for 1½ hours. Propylene consumption was rapid. At the end of the reaction period, the reaction mixture was quenched with 10 ml. of distilled water. A solid precipitate appeared. The organic phase was separated and 26.2 g. of propylene dimers were recovered by distillation.

A two ml. portion of the dimers was reduced with hydrogen over a platinum oxide catalyst to determine the isomer distribution. Gas-liquid chromatographic analysis of the hydrogenated sample showed the presence of 66.5 weight percent 2-methylpentane, 28.8 weight percent normal hexane, 4.1 weight percent 2,3-dimethylbutane, and 0.7 weight percent of 3-methyl pentane.

The above data show that the present catalyst system is very active for the conversion of propylene to dimers.

EXAMPLE II

The solid which was recovered from Example I by filtration was washed with water. It was then dried in a vacuum over 120° C. for about 45 minutes. The solid was then charged to a reactor with 20 cc. of chlorobenzene. To the solution was added 1 ml. of a 1 molar ethylaluminum dichloride solution in chlorobenzene. The reactor was then maintained at a temperature of about 13° C. and propylene was pressured into the flask at 30 p.s.i.g. and maintained at that pressure for 1.5 hours.

After the reaction period, the reaction mixture was quenched by the addition of 10 cc. of water. The organic layer was separated and distilled yielding 35.14 grams of propylene dimers.

After hydrogenation and analysis by gas-liquid chromatography, a sample of the product showed the presence of 71 weight percent 2-methyl-pentane, 24.5 weight percent of normal hexane, 4.1 weight percent of 2,3-dimethylbutane, and 0.3 weight percent of 3-methylpentane.

The above data demonstrate that the nickel complex can be easily recovered and reused to form a catalyst system which is effective for the conversion of propylene to dimers.

Although this invention has been described in considerable detail, it must be understood that such detail is for the purpose of illustration only and that many variations and modifications can be had by one skilled in the art without departing from the spirit and the scope thereof.

I claim:

1. A process for oligomerizing 1-monoolefins having 2 to 12 carbon atoms comprising contacting under reaction conditions at least one said 1-monoolefin with a catalyst system comprising an organoaluminum compound $R_xAlX_y$ wherein R is a hydrocarbon radical having from 1 to 20 carbon atoms, X is a halogen, $x$ is an integer from 1 to 3, $y$ is 0 or an integer from 1 to 2, and $x$ plus $y$ equals 3 and a nickel complex $(R_2'P—CH=CH—PR_2')NiX_2$ wherein each R' is alkyl, cycloalkyl, or aryl radical having up to 20 carbon atoms;

wherein the mole ratio of said organoaluminum compound to said nickel complex ranges from 0.5:1 to 20:1, and the mole ratio of said nickel complex to said 1-monoolefin ranges from 0.00001:1 to 0.1:1; and wherein said nickel complex is recovered by admixing an effective amount of water or aqueous acid solution with the reaction mixture and recovering said nickel complex as the formed precipitate, and wherein said recovered nickel complex is recycled to the catalytic zone.

2. A process according to claim 1 wherein said 1-monoolefin is propylene.

3. A process according to claim 1 wherein said organoaluminum compound is ethylaluminum dichloride.

4. A process according to claim 1 wherein said contacting is carried out at a temperature range of —80 to 100° C., at a pressure ranging from 0 to 2000 p.s.i.g., and for a time ranging from 0.1 minute to 20 hours.

5. A process according to claim 1 wherein said nickel complex is [1,2 - bis(diphenylphosphino)ethylene]dichloronickel.

References Cited

UNITED STATES PATENTS

| 3,405,194 | 10/1968 | Iwamoto et al. | 260—680 |
| 3,482,001 | 12/1969 | Eberhardt | 260—683.15 |
| 3,485,881 | 12/1969 | Zuech | 260—683.15 X |
| 3,511,891 | 5/1970 | Taylor et al. | 260—683.15 |

PAUL M. COUGHLAN, JR., Primary Examiner

U.S. Cl. X.R.

252—431 P